(12) United States Patent
Ferlitsch (10) Patent No.: US 8,325,190 B2
(45) Date of Patent: Dec. 4, 2012

(54) SYSTEMS AND METHODS FOR PROVIDING VISUAL NOTIFICATIONS RELATED TO AN IMAGING JOB

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1034 days.

(21) Appl. No.: 12/326,799

(22) Filed: Dec. 2, 2008

(65) Prior Publication Data

US 2010/0134824 A1    Jun. 3, 2010

(51) Int. Cl.
*G06T 13/00* (2011.01)
(52) U.S. Cl. ........................................ 345/473
(58) Field of Classification Search .................. None
See application file for complete search history.

(56) References Cited

U.S. PATENT DOCUMENTS

| | | | |
|---|---|---|---|
| 5,706,411 A * | 1/1998 | McCormick et al. | ........ 358/1.14 |
| 6,519,048 B1 | 2/2003 | Tanaka | |
| 2002/0046238 A1 | 4/2002 | Estavillo et al. | |
| 2003/0076359 A1 | 4/2003 | Martinez et al. | |
| 2003/0234957 A1 | 12/2003 | Ohara | |
| 2004/0030596 A1 | 2/2004 | Attar et al. | |

FOREIGN PATENT DOCUMENTS

| | | |
|---|---|---|
| EP | 1176500 | 1/2002 |
| JP | 07-013716 | 1/1995 |
| JP | 2003-125125 | 4/2003 |
| JP | 2003-280867 | 10/2003 |
| JP | 2006-163675 | 6/2006 |
| JP | 2008-003833 | 1/2008 |
| WO | 9117530 | 11/1991 |

OTHER PUBLICATIONS

Microsoft Windows, "Microsoft Windows AsyncUI Notification," http://download.microsoft.com/download/a/f/7/af7777e5-7dcd-4800-8a0a-b18336565f5b/AsyncUI.doc, May 9, 2006.
Hewlett Packard, "HP PCL/PJL Reference, Printer Job Language Technical Reference Manual," http://www.service.belhard.com/documentation/PJL_trm.pdf, Apr. 1999.
Office Action issued for Japanese Patent Application No. 2009-266175 on Oct. 4, 2011.

* cited by examiner

*Primary Examiner* — Edward Martello
(74) *Attorney, Agent, or Firm* — Austin Rapp & Hardman (57) ABSTRACT

A method for providing visual notifications related to an imaging job is disclosed. The method may implemented by an imaging device. The method may include receiving the imaging job as input. The method may also include producing desired output for the imaging job. The method may also include causing the display of at least one animated notification that depicts the progress of the imaging job.

20 Claims, 12 Drawing Sheets

SYSTEMS AND METHODS FOR PROVIDING VISUAL NOTIFICATIONS RELATED TO AN IMAGING JOB

TECHNICAL FIELD

The present disclosure relates generally to imaging devices and imaging-related technology. More specifically, the present disclosure relates to systems and methods for providing visual notifications related to an imaging job.

BACKGROUND

Imaging devices are frequently used in many aspects of business, industry and academic endeavors. An imaging device is a device that has at least one imaging capability, such as printing, faxing, copying, scanning, publishing to the World Wide Web, filing, format conversion, etc. The term "imaging," as used herein, should be interpreted broadly to include any process for producing a copy of a document onto paper, a computer screen, a digital whiteboard, an electronic image, other media surfaces, or the like.

Printers are one kind of imaging device. Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Some imaging devices can generate scanned image data. For example, some imaging devices include scanners which can scan a document to provide scanned image data. It is also possible that an imaging device may be able to read scanned image data from a storage device, extract scanned image data from a facsimile transmission, or compose scanned image data from a variety of imaging operations. There may also be other ways in which an imaging device may be provided with or otherwise obtain scanned image data. Other commonly used imaging devices include copiers, fax machines, multi-function peripheral (MFP) devices, etc.

Benefits may be realized by improved systems and methods related to imaging devices and imaging-related technology.

DETAILED DESCRIPTION

A method for providing visual notifications related to an imaging job is disclosed. The method may be implemented by an imaging device. The method may include receiving the imaging job as input. The method may also include producing desired output for the imaging job. The method may also include causing the display of at least one animated notification that depicts the progress of the imaging job. An example of an animated notification that may be used is an animated image.

Causing the display of an animated notification may include rendering the animated notification to a display of the imaging device. Alternatively, causing the display of an animated notification may include sending the animated notification to a remote interface. The remote interface may be a web server. The web server may dynamically generate a web page that incorporates the animated notification.

The animated notification(s) may be embedded in the imaging job. Alternatively, or in addition, the imaging job may include at least one reference to an animated notification. As another alternative, the entire progress of the imaging job may be represented by a single animated image. In this situation, the imaging job may include at least one command to display a frame sequence within the animated image. As yet another alternative, the animated notification(s) may be included in firmware of the imaging device.

The animated notification(s) may reflect the progress of the imaging job across multiple imaging devices. The animated notification(s) may be rendered by a process on a separate imaging device that is external to the imaging device. The animated notification(s) may be user interactive.

An imaging device is also disclosed. The imaging device may include a processor, memory in electronic communication with the processor, and instructions stored in the memory. The instructions may be executable to receive an imaging job as input. The instructions may also be executable to produce desired output for the imaging job. The instructions may also be executable to cause the display of at least one animated notification that depicts the progress of the imaging job.

A computer-readable medium for providing visual notifications related to an imaging job is disclosed. The computer-readable medium may include executable instructions for receiving the imaging job as input. The computer-readable medium may also include executable instructions for producing desired output for the imaging job. The computer-readable medium may also include executable instructions for causing the display of at least one animated notification that depicts the progress of the imaging job.

Figure 1:
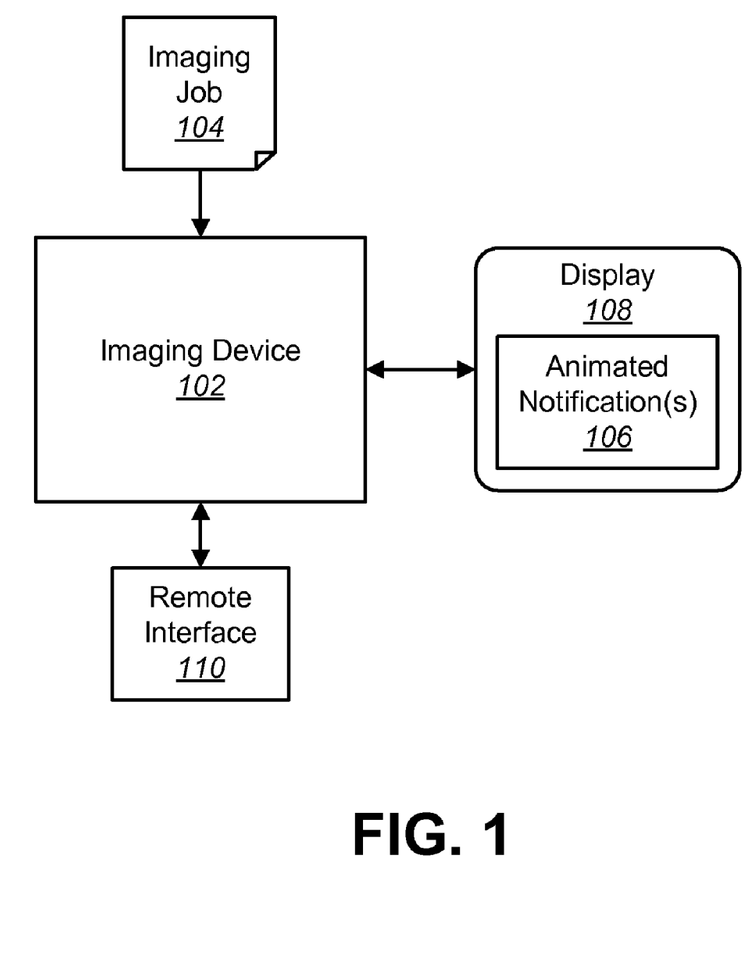
FIG. 1 illustrates an exemplary operating environment for the present disclosure.

FIG. 1 illustrates an exemplary operating environment for the present disclosure. The exemplary operating environment includes an imaging device 102. An imaging device 102 is a device that has at least one imaging capability, such as printing, faxing, copying, scanning, publishing to the World Wide Web, filing, format conversion, etc. Examples of imaging devices 102 include multi-function peripheral (MFP) devices, printers, fax machines, copiers, scanners, etc.

The imaging device 102 may receive an imaging job 104 as input. The imaging job 104 may include one or more imaging-related tasks that are to be performed with respect to a document or a set of documents. The imaging device 102 may produce desired output for the imaging job 104. The imaging device 102 may receive either a softcopy input or a hardcopy input and produce either a softcopy output or a hardcopy output.

The imaging job 104 may be input as a walkup job. For example, the imaging job 104 may be received as input from a Universal Serial Bus (USB) memory stick, from a hardcopy scanner, from a remote site (e.g., where the data is pulled from an operation initiated at the imaging device 102, which may be referred to as pull printing).

Alternatively, the imaging job 104 may be received from a remote interface 110. For example, the imaging job 104 may be a personal computer (PC) based job (e.g., Ipr, RAW 9100, Internet Printing Protocol, etc.). As another example, the imaging job 104 may be received as input via email, via the File Transfer Protocol (FTP), via a web page, etc.

The type of output that is produced may depend on the type of imaging job 104 that is being performed. For example, the desired output for a print job or a copy job may include one or more physical pages. The desired output for a fax job or a scan job may be digital data, which may then be transmitted to a remote location (in the case of a fax job) or saved as an electronic file (in the case of a scan job).

The imaging device 102 may provide visual notifications related to the imaging job 104. More specifically, the imaging device 102 may cause the display of one or more animated notifications 106 that depict the progress of the imaging job 104. For example, the imaging device 102 may render the animated notifications 106 to a display 108 of the imaging device 102. The display 108 may be, for example, a liquid crystal display (LCD) touch screen. The imaging device 102 may be capable of rendering the animated notifications 106 in real time. The display 108 may be located on a "walk-up" operations panel of the imaging device 102 (i.e., an operations panel that is physically located on the imaging device 102 and that may be used by someone who walks up to the imaging device 102).

As another example, the imaging device 102 may send the animated notifications 106 to a remote interface 110 (i.e., to a destination other than the display 108 of the imaging device 102), such as a web server or a software application, which may be external to the imaging device 102. The remote interface 110 may be considered to be a remote operations panel. Examples involving remote interfaces 110 will be described in greater detail below.

Figure 2:
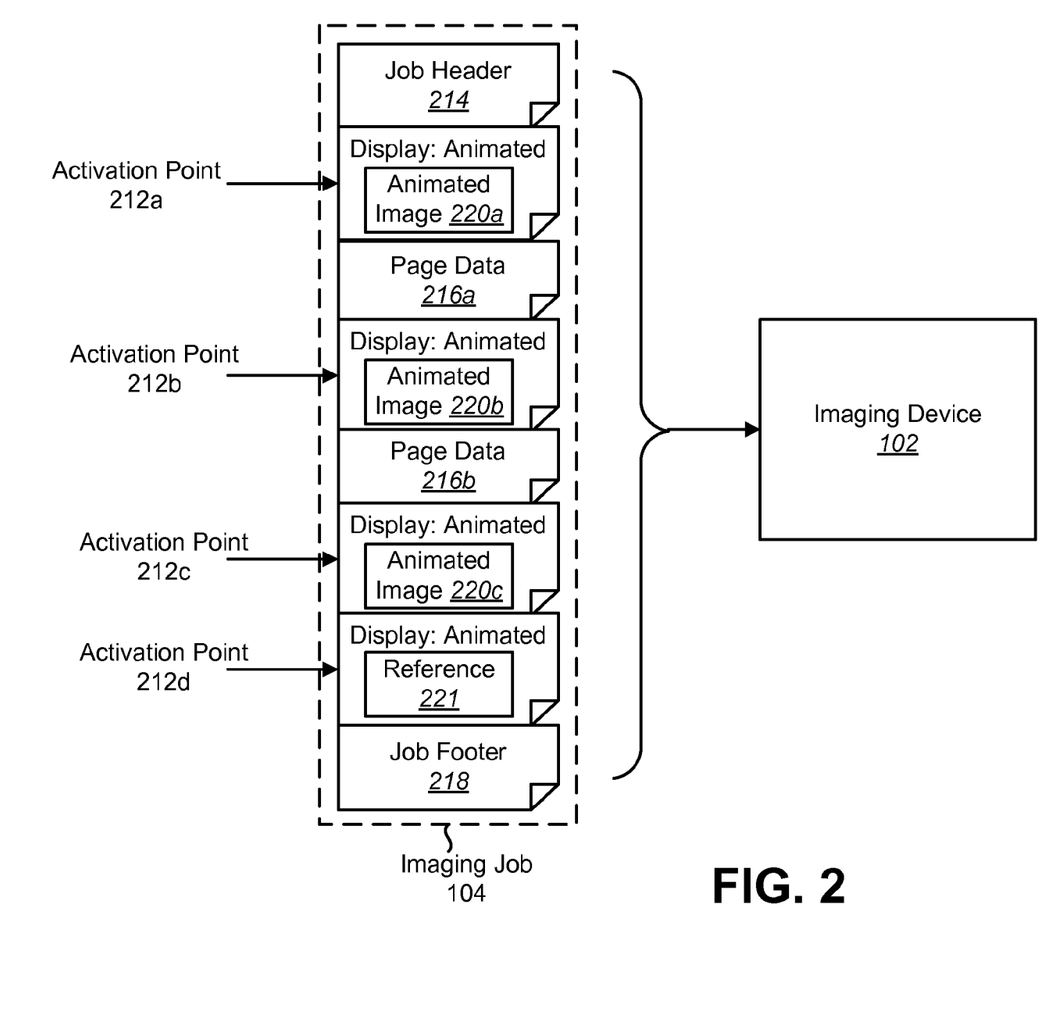
FIG. 2 illustrates an imaging job being provided to an imaging device.

FIG. 2 illustrates the imaging job 104 being provided to the imaging device 102. An animated notification 106 may be an animated image 220. An animated image 220 may include multiple image frames. When an animated image 220 is displayed, the multiple image frames may be displayed in rapid succession to form an animation. An animated image 220 may include an audio clip with the animation. Alternatively, an animated notification 106 may be a video file, an audio file, or a file containing both audio and video (e.g., a Moving Pictures Experts Group (MPEG) file).

In the example shown in FIG. 2, the animated images 220 may be generated on the host side and downloaded with the imaging job 104. Also, in this example, each notification 106 is represented by a separate animated image 220.

The imaging job 104 includes various activation points 212. An activation point 212 is a location within the imaging job 104 where an animated image 220 should be displayed. The animated images 220 may be placed in locations that correspond to completed sections of work, which may be recognizable to the user/viewer. Examples of activation points 212 may include the start of the imaging job 104 (i.e., the location within the imaging job 104 after the header 214), the end of the imaging job 104 (i.e., the location within the imaging job 104 before the footer 218), the start and/or the end of a logical page, the start and/or the end of a group of sheets (e.g., a chapter), the start and/or the end of specific types of complex rendering items, a location that results in an animated image 220 being displayed whenever a copy of a document is completed, etc.

An animated image 220 may be embedded in an imaging job 104 at an activation point 212. For example, the animated images 220a, 220b, 220c are embedded in the imaging job 104 shown in FIG. 2 at the activation points 212a, 212b, 212c. Alternatively, an activation point 212 may include a reference 221 to an animated image 220, instead of the animated image 220 itself. For example, the activation point 212d in the imaging job 104 shown in FIG. 2 includes a reference 221 to an animated image 220. The reference 221 may be a Universal Resource Indicator (URI).

Where the imaging job 104 includes a reference 221 to an animated image 220, the animated image 220 may be downloaded to the imaging device 102 separate from the imaging job 104 itself, either before or after the imaging job 104 is downloaded. For example, the animated image 220 may be downloaded to the imaging device 102 before the imaging job 104 is downloaded to the imaging device 102, and the reference 221 may indicate the location of the animated image 220 on the imaging device 102. Alternatively, the reference 221 may indicate the location of the animated image 220 on another computing device (i.e., a device that is separate from the imaging device 102) from which the imaging device 102 may download the animated image 220.

There are many ways that the insertion of the animated notifications 106 (e.g., animated images 220 and/or references 221) may occur. For example, a computer program may convert a document into printing instructions that are processed by a printer driver (operating on the same computing device or another computing device) into printer-ready data for the imaging device 102 where the animated notifications 106 will be rendered. The animated notifications 106 may be inserted into the generated printer-ready data by the printer driver.

As another example, the animated notifications 106 may be inserted by a computer program that parses and modifies printer-ready data, operating on an imaging device 102. The computer program may parse the printer-ready data according to the format of the data (e.g., PS, PCL, PDF, XPS), locating activation points 212 and inserting the animated notifications 106 at the activation points 212.

Figure 3:
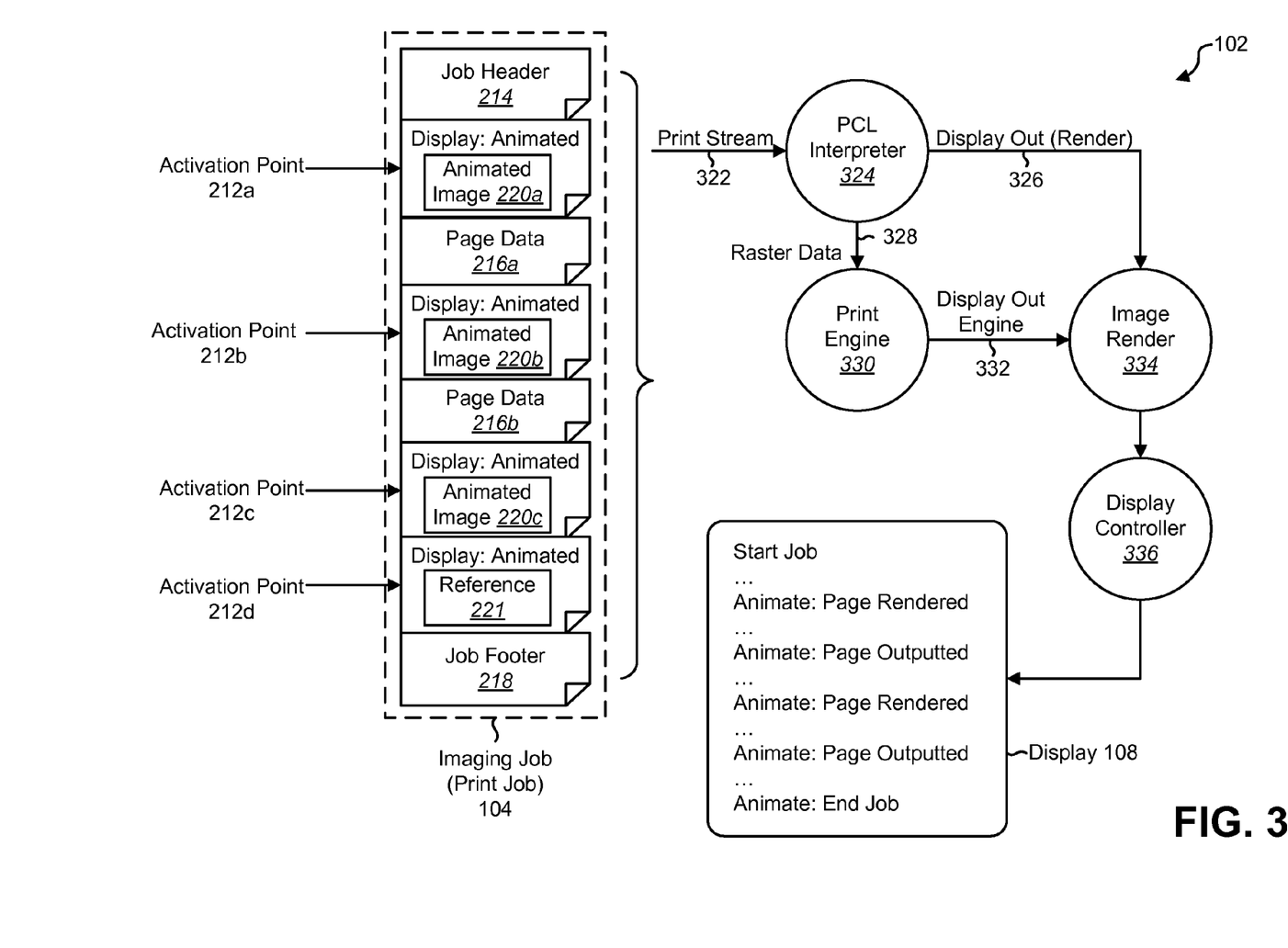
FIG. 3 illustrates an example showing how an imaging job may be processed in accordance with the present disclosure.

FIG. 3 illustrates an example showing how the imaging job 104 may be processed in accordance with the present disclosure. In this example, it will be assumed that the imaging job 104 is a print job 104. Once rendering of the print job 104 starts, the print stream 322 may be passed to the corresponding renderer 324 (e.g., a Printer Command Language (PCL) interpreter 324). The renderer 324 may be programmed to recognize the embedded animated images 220 and/or the references 221 to animated images 220. For example, recognition may occur by a language-specific code (e.g., a PCL command), a special signature, etc.

The renderer 324 may then process the animated images 220 at the time they are encountered in the print stream 322. For each, if the animated image 220 is after the job header 214, the renderer 324 may first process the job header 214 (i.e., setting up the job environment), and then process the animated image 220, before proceeding onto the print data. Likewise, if the animated image(s) 220 are placed at page boundaries, the renderer 324 may first process the page data, and then process the animated image 220 before proceeding onto the next page.

The animated images 220 may also be annotated with information (e.g., metadata) indicating the desired process that should initiate the display of the animated image 220. For example, by default initiation may be initiated by the renderer 324. If the renderer 324 is for a softcopy-to-hardcopy output (e.g., print/fax job), the animated image 220 may be initiated once the softcopy data is converted into engine-ready data. The annotation may indicate that the animated image 220 should be issued by the engine process 330. Thus, the display of the animated image 220 may be deferred until the output engine 330 outputs the proceeding print data (e.g., output hardcopy printed sheet(s)). In this case, the renderer 324 may convey the request for displaying the animated image 220 to the downstream target process (e.g., output engine 330) by passing the animated image 220 (or reference 221) along with the renderer's output (e.g., raster data 328).

Initiation of displaying the animated image 220 may occur by the target process passing the animated image 220 to the display controller 336 in real-time. The display controller 336 may then render the animated image 220 into a display-specific format and output the display data onto the display 108. Alternatively, the display data may be output to a remote interface 110 (which will be discussed in greater detail below).

The following contains descriptions of examples of animated notifications 106. An animated notification 106 that is displayed at the start of an imaging job 104 may indicate the initiation and possible total amount of work to do. For example, in a fax job, the animated notification 106 may show a phone being dialed. Behind the phone there may be a stack of paper roughly corresponding to the number of sheets to fax.

In a print job 104, the animated notification 106 may show the selected output bin/finisher positioning itself. Behind the selected output bin/finisher there may be a stack of paper roughly corresponding to the number of sheets to be printed.

In a scan job, the animated notification 106 may show a user placing a stack of paper into the document scanner, where the stack of paper roughly corresponds to the number of sheets to be scanned.

The animated notification 106 that is displayed for the completion of a page (or sheet) may indicate the completion of the sheet and the current amount of work completed. For example, in a fax job, the animated notification 106 may show a page moving from one telephone to another. Behind the first telephone there may be a stack representing the remaining sheets to fax, and after the second telephone there may be a stack representing the number of sheets sent.

In a print job 104, the animated notification 106 may show a sheet being output into the output bin. The remaining sheets in an input bin may represent the remaining sheets to print, and the number of sheets in the output bin may represent the number of sheets outputted so far.

The animated notification 106 that is displayed for the end of an imaging job 104 may indicate the completion of the job 104 and the total amount of work done. For example, in a fax job, the animated notification 106 may show the phones hanging up and the stack of sheets after the second (receiving) phone representing the number of sheets sent.

In a print job 104, the animated notification 106 may show the finisher executing the last step (e.g., staple) and the number of sheets in the output bin representing the number of sheets that have been output.

Figure 4:
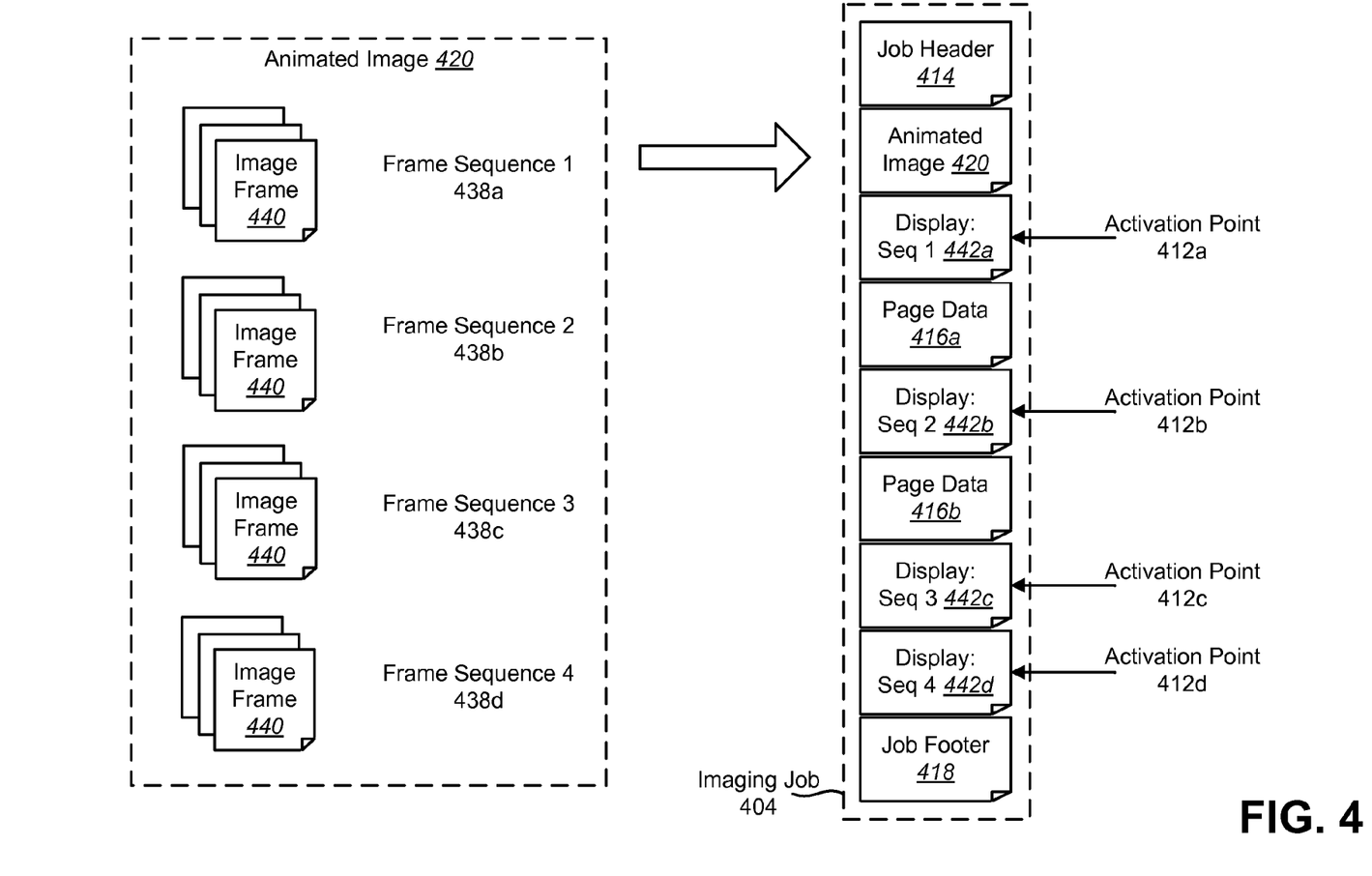
FIG. 4 illustrates how the entire progress of an imaging job may be represented by a single animated image.

FIG. 4 illustrates how the entire progress of an imaging job 404 may be represented by a single animated image 420 (as opposed to separate animated images 220, as shown above). The animated image 420 may be downloaded (or referenced) prior to the imaging job 404 or prior to the page data 416. The animated image 420 may include multiple frame sequences 438. Each frame sequence 438 may include a subset of all of the image frames 440 within the animated image 420. The different frame sequences 438 may represent different notifications (e.g., the start of the imaging job 404, page progressions, the end of the imaging job 404, etc.).

Instead of embedding separate animated images 420 (or references to animated images 420) at each activation point 412, each activation point 412 may instead include a command 442 to display the frame sequence 438 within the animated image 420 that provides the appropriate notification for that activation point 412. In the example shown in FIG. 4, the imaging job 404 includes a command 442a to display the first frame sequence 438a at the first activation point 412a, a command 442b to display the second frame sequence 438b at the second activation point 412b, a command 442c to display the third frame sequence 438c at the third activation point 412c, and a command 442d to display the fourth frame sequence 438d at the fourth activation point 412d.

When a notification is then initiated, the target process 330 may pass to the display controller 336 the frame sequence 438 in addition to the animated image 420. The display controller 336 may then only render the frame sequence 438 for display, instead of the entire animated image 420.

Figure 5:
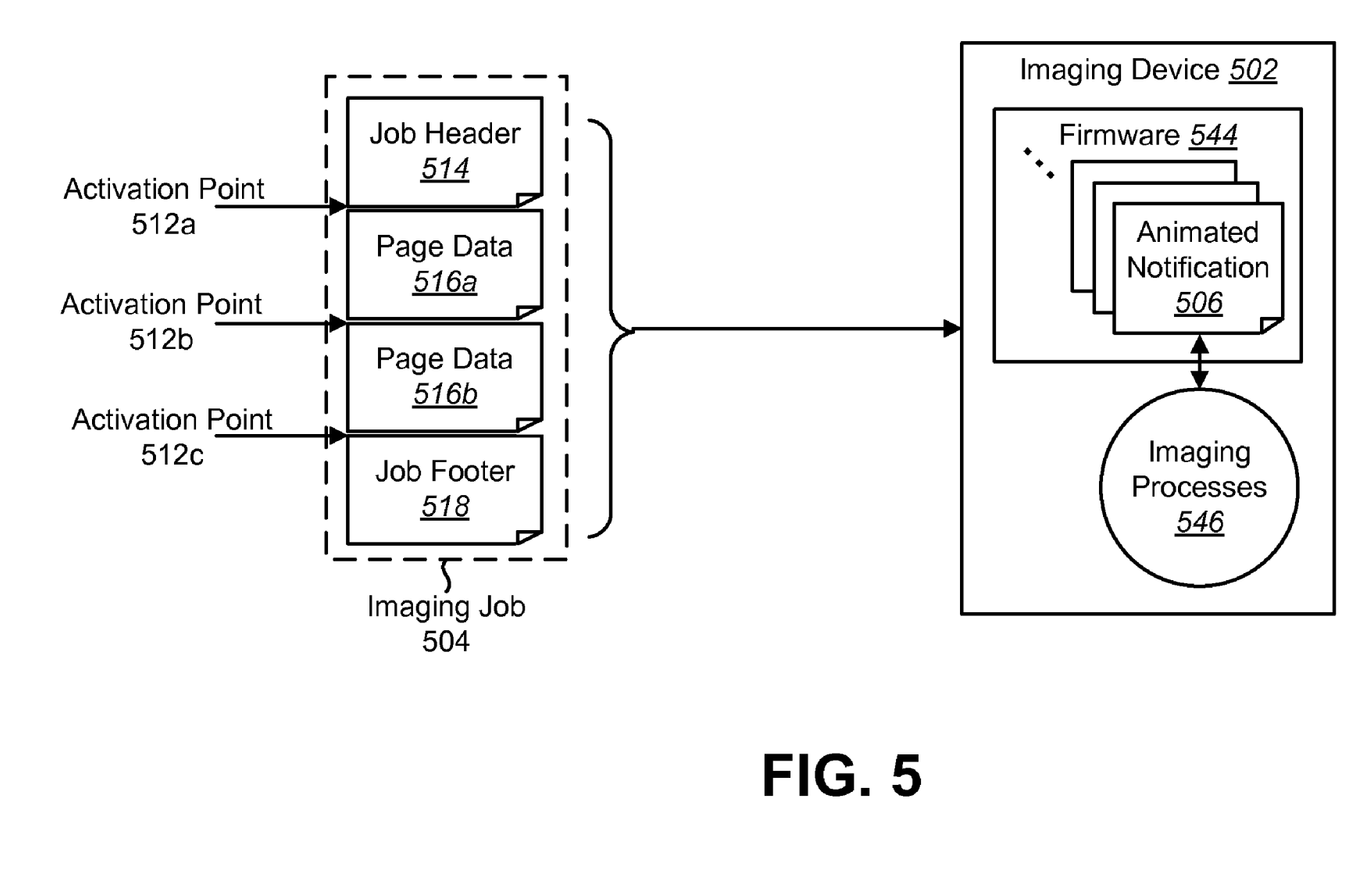
FIG. 5 illustrates an example where an imaging job does not have any animated notifications embedded in it.

FIG. 5 illustrates an example where the imaging job 504 does not have any animated notifications (e.g., animated images, references to animated images, audio/video files, etc.) embedded in it. Instead, the animated notification(s) 506 are "built in" to the imaging device 502 itself (e.g., included in firmware 544 of the imaging device 502). The imaging processes 546 within the imaging device 502 have inherent knowledge of the animated notification(s) 506. The imaging processes 546 may cause the display of a built-in animated notification 506 at predetermined activation points 512 within the imaging job 504 (e.g., job start/end, page start/end). The imaging processes 546 may be configured to recognize these activation points 512 and display animated notification(s) 506 at these activation points 512, even if the imaging job 504 itself does not include any instructions that specifically direct the imaging device 502 to display the animated notification(s) 506. Alternatively, the imaging job 504 may include a command that instructs the imaging device 502 to use animated notification(s) 506 for display notifications.

Figure 6:
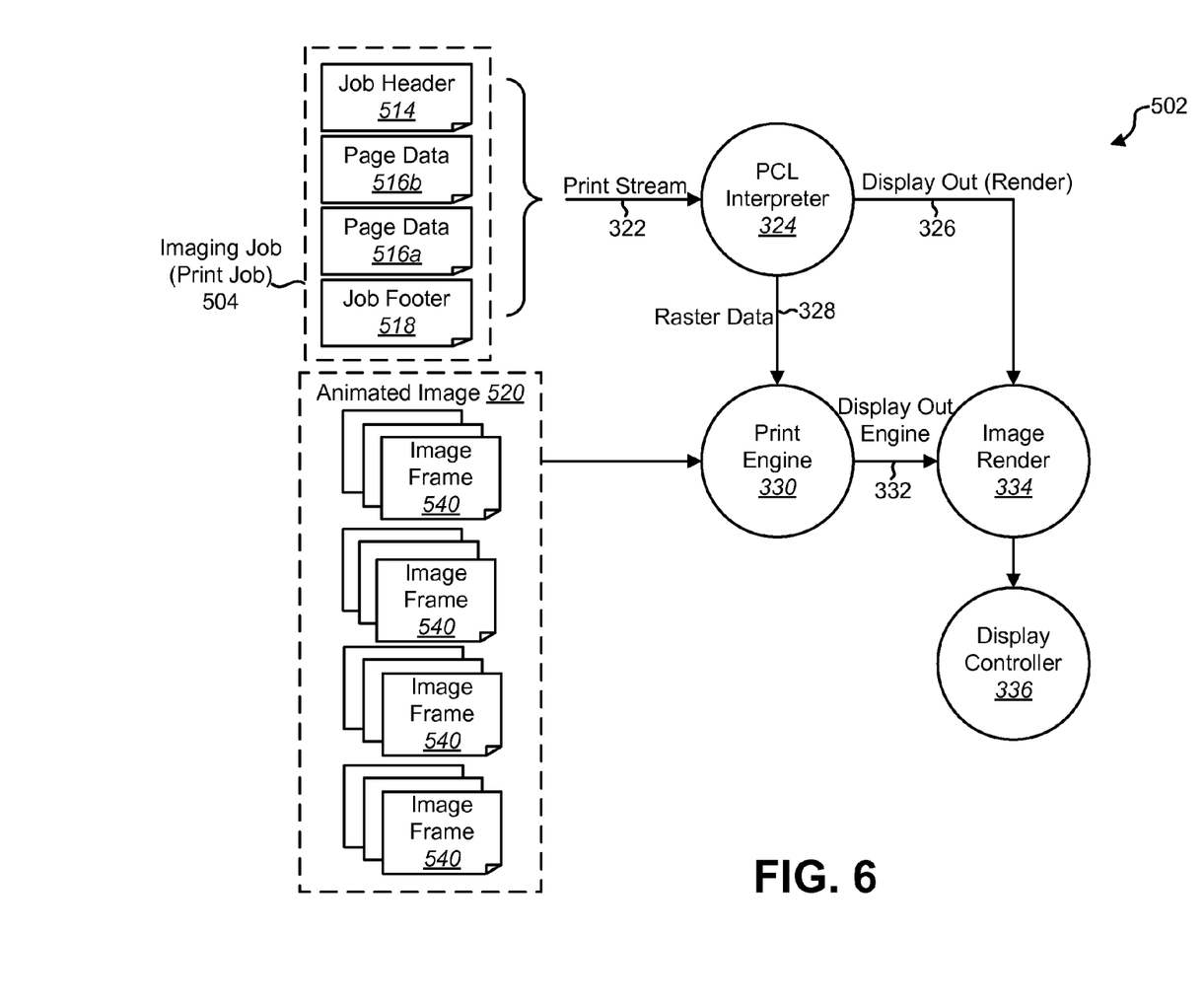
FIG. 6 illustrates how the imaging job of FIG. 5 may be processed.

FIG. 6 illustrates how the imaging job 504 of FIG. 5 may be processed. It will be assumed that the imaging job 504 is a print job 504. Once rendering is to be initiated, the imaging device 502 may perform a "pre-pass" over some or all of the print data to determine the design of the animated notification 506, which in this example is an animated image 520. Factors may include the type of job (e.g., print, copy, scan, fax, file, publish, etc.), special options associated with the job (e.g., staple, punch, copies, etc.), the number of pages or sheets involved, etc. The imaging device 502 may then dynamically construct an animated image 520 using predefined frames 540 built into the imaging device 502. Operation of the animated images 520 may then otherwise be the same as described above.

Figure 7:
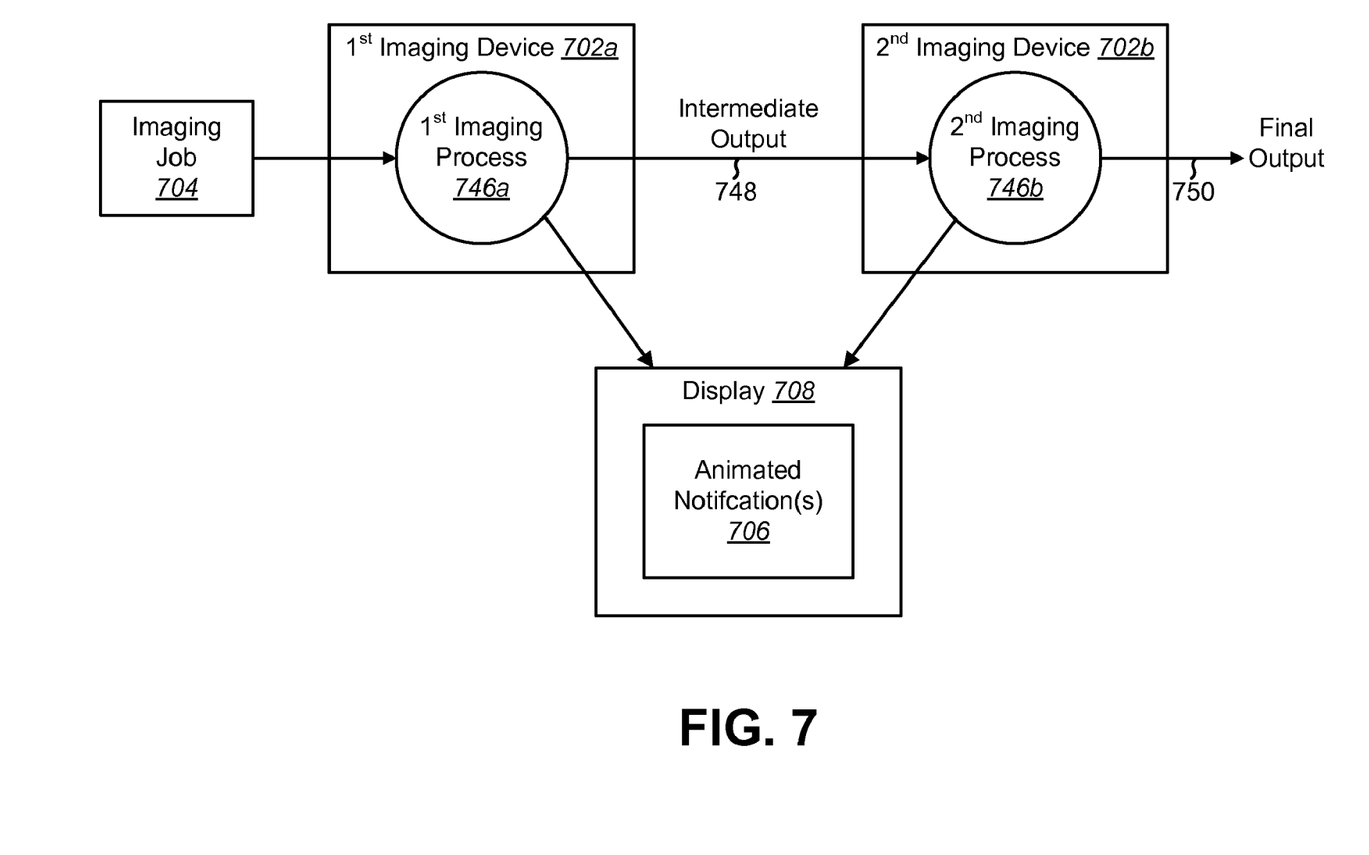
FIG. 7 illustrates how one or more animated notifications may be displayed to reflect the progress of an imaging job across multiple imaging devices.

FIG. 7 illustrates how one or more animated notifications 706 may be displayed to reflect the progress of an imaging job 704 across multiple imaging devices 702. An imaging job 704 may be provided to a first imaging process 746a on a first imaging device 702a. The first imaging process 746a may perform one or more imaging-related tasks, thereby producing intermediate output 748. The first imaging process 746a may cause one or more animated notifications 706 to be displayed on a display 708 (or, alternatively, a remote interface 110) at various stages of the imaging-related tasks that it performs. The animated notifications 706 that are displayed by the first imaging process 746a may reflect the progress of the imaging-related tasks that are being performed by the first imaging process 746a.

The intermediate output 748 may be provided to a second imaging process 746b on a second imaging device 702b. The second imaging process 746b may also perform one or more imaging-related tasks, thereby producing final output 750. The second imaging process 746b may also cause one or more animated notifications 706 to be displayed on the display 708 at various stages of the imaging-related tasks that it performs. The animated notifications 706 that are displayed by the second imaging process 746b may reflect the progress of the imaging-related tasks that are being performed by the second imaging process 746b.

The display 708 may be part of the first imaging device 702a, part of the second imaging device 702b, or separate from both the first imaging device 702a and the second imaging device 702b.

Although the first and second imaging processes 746a, 746b are shown on different imaging devices 702a, 702b in FIG. 7, the first and second imaging processes 746a, 746b may alternatively be located on the same imaging device 702.

The first imaging process 746a may be a scanning process, and the second imaging process 746b may be an optical character recognition (OCR) process. This may the case, for example, if the imaging job 704 is provided to a scan-to-OCR server. The first imaging device 702a may generate an animated notification 706 to show the progress of scanning the document(s) in the imaging job 704 and converting to scanned image data. The second imaging device 702b may generate another animated notification 706 that shows the progress of the OCR. For example, the image file directory (IFD) in each image page in the scanned image data may contain a proprietary link to the animated notification 706. When OCR is complete, the OCR process may then render and display the associated animated notification 706.

Figure 8:
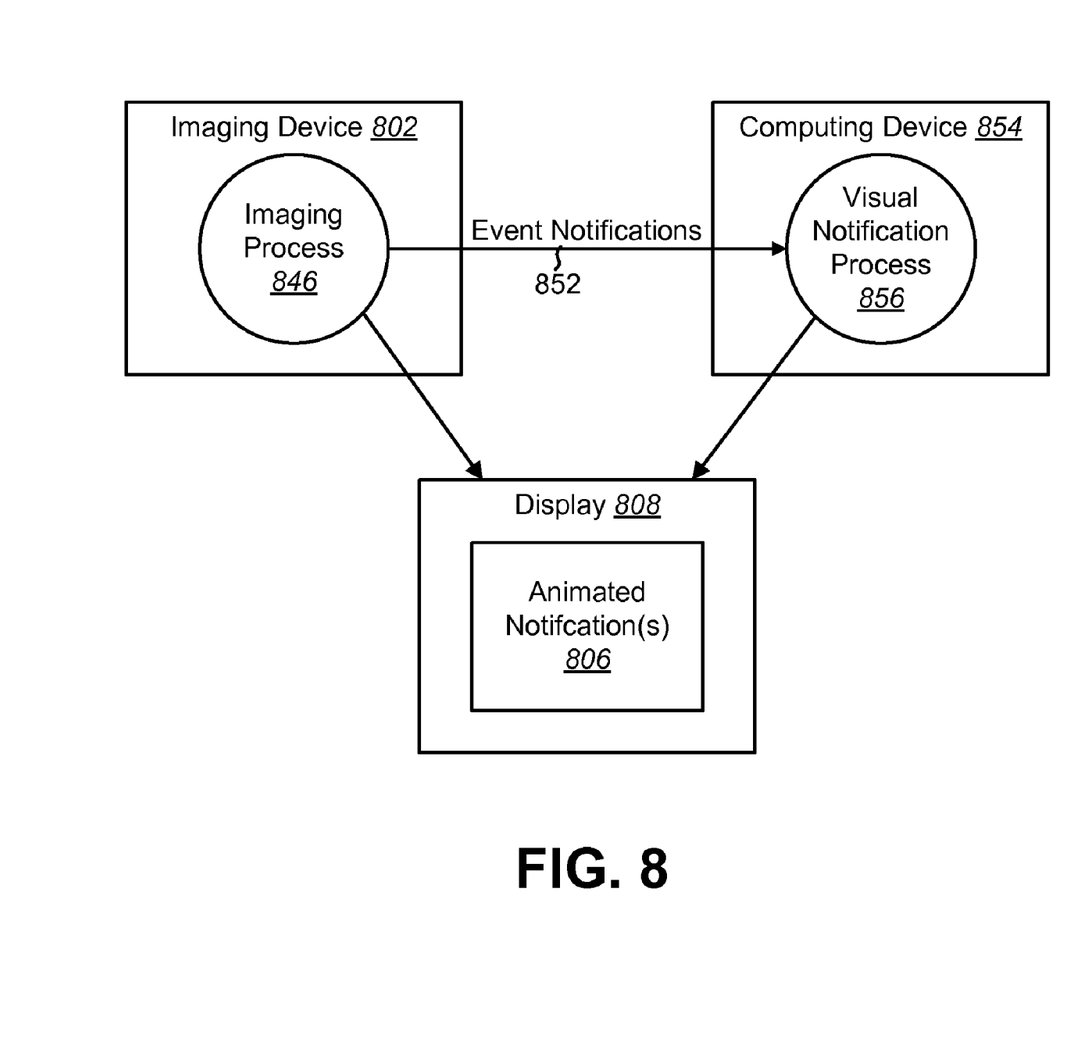
FIG. 8 illustrates how an animated notification may be rendered by a process that is external to an imaging device.

FIG. 8 illustrates how an animated notification 806 may be rendered by a process 856 that is external to an imaging device 802. A process 856 on a separate computing device 854 (which will be referred to as a visual notification process 856) may generate one or more animated notifications 806 but not download them to the imaging device 802. The visual notification process 856 may monitor the imaging device 802. For example, imaging processes 846 on the imaging device 802 may send event notifications 852 to the visual notification process 856. The event notifications 852 may be sent in response to requests from the visual notification process 856 (i.e., polling), or the event notifications 852 may be sent even if no such requests are received. In response to receiving an event notification 852 corresponding to a particular progress point of an imaging job 104, the visual notification process 856 may render the appropriate animated notifications 806 to a display 808 of the imaging device 802 (or to a separate display 808, or to a remote interface 110).

Figure 9:
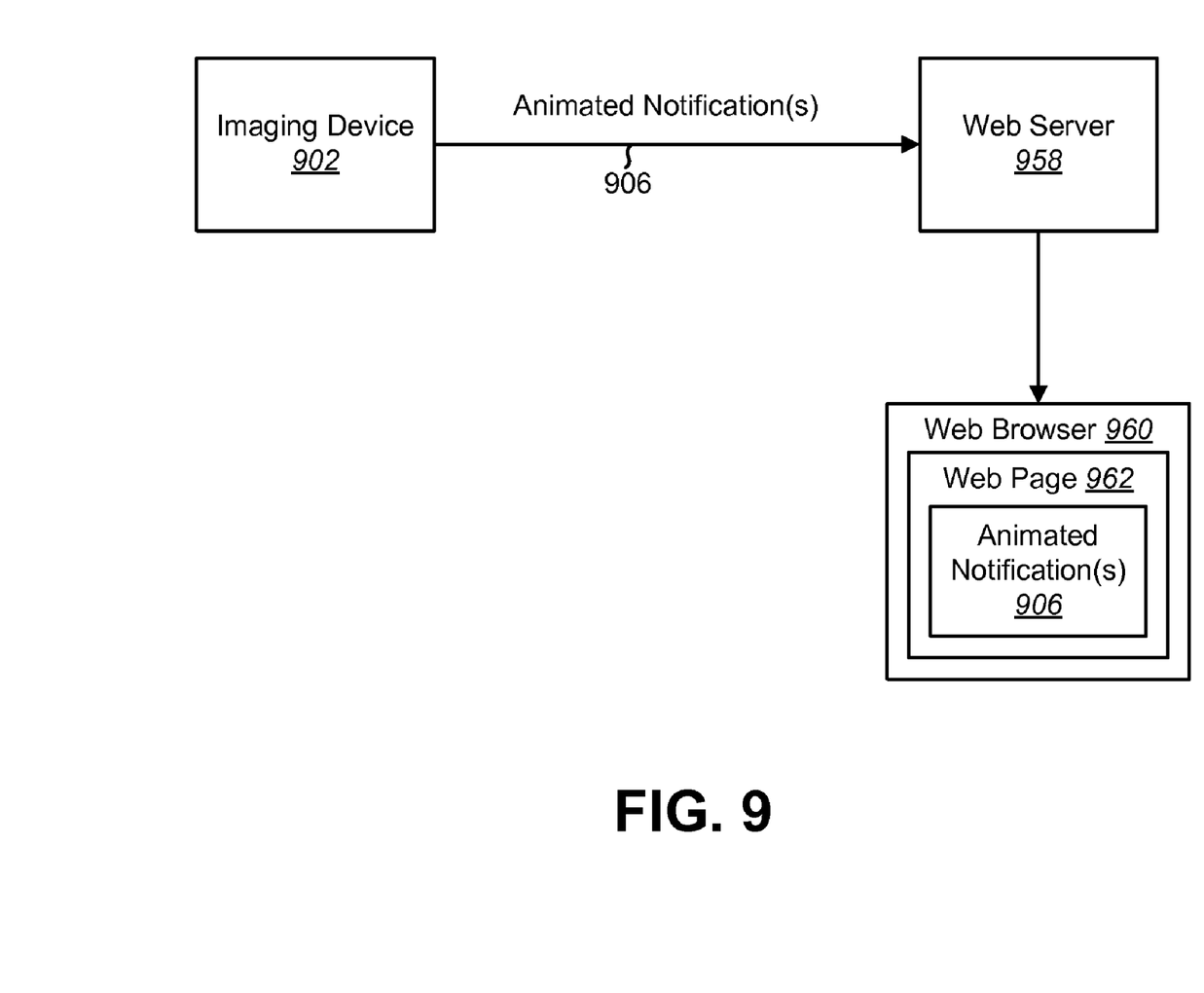
FIG. 9 illustrates how an imaging device may send animated notifications to a remote interface, which in this example is a web server.

FIG. 9 illustrates how an imaging device 902 may send one or more animated notifications 906 to a remote interface 110, which in this example is a web server 958. In response to receiving the animated notification(s) 906, the web server 958 may dynamically generate a web page 962 that incorporates the animated notification(s) 906. The web page 962 may then be provided to and displayed by a web browser 960.

The web page 962 may be a device-embedded web page. The imaging device 902 may render the animated notification(s) 906 and output the display data to the web server 958.

Alternatively, the animated notification(s) 906 may be sent to a software application for display. The software application is another example of a remote interface 110. For example, the software application may be a printer monitor which listens for events directed to the application (e.g., listens on a specific communication port). When a message is received, the software application may interpret the message and display the animated notification 906.

Figure 10:
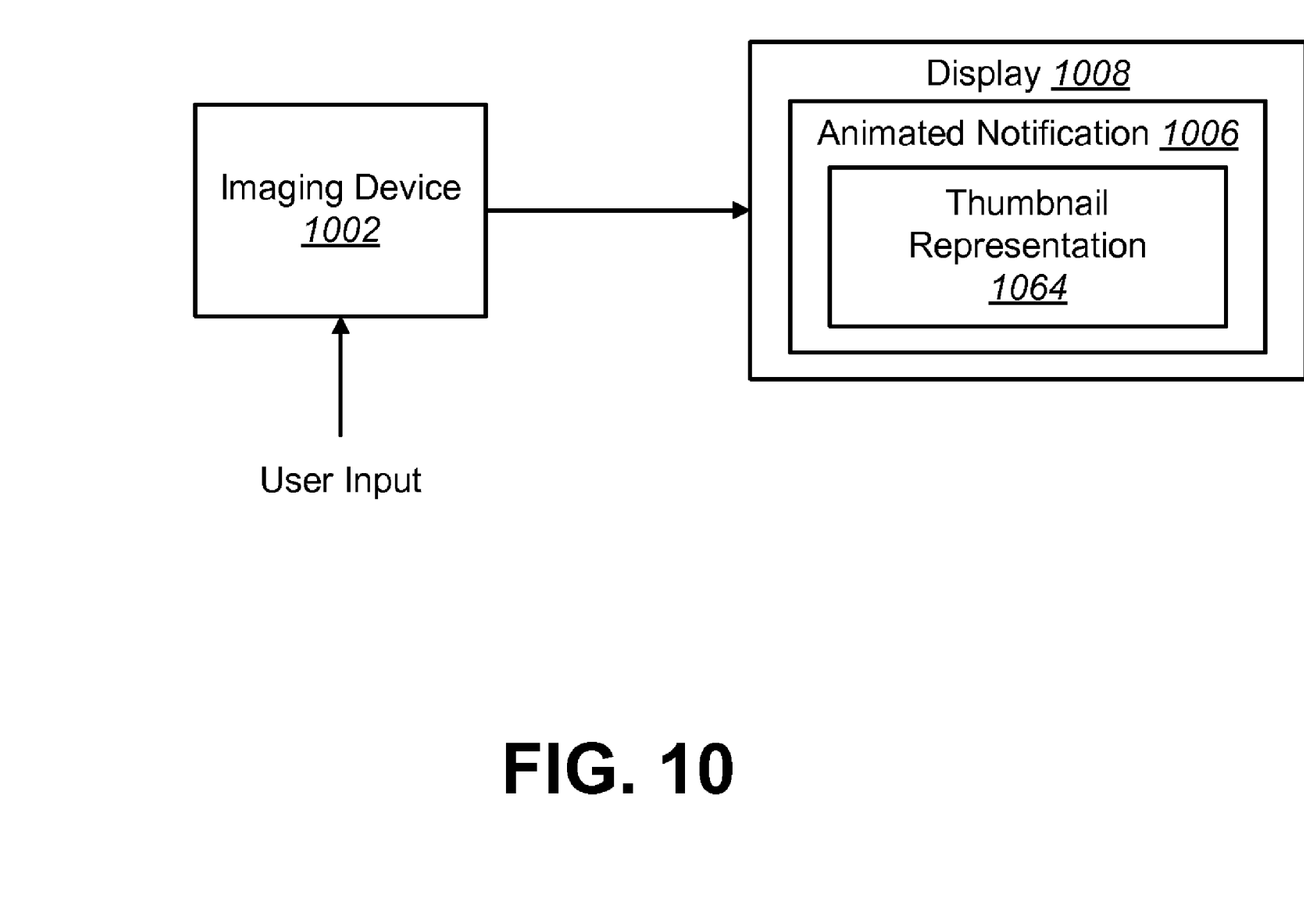
FIG. 10 illustrates how an animated notification may be user interactive.

FIG. 10 illustrates how an animated notification 1006 may be user interactive. If the animated notification 1006 shows sheets of the outputted job, the sheets may be associated with a thumbnail representation 1064 of the outputted page. The user may then interactively interact with the notification 1006. For example, user input may be provided to pause the notification 1006 and select a sheet. The resulting action may cause the thumbnail representation 1064 to be displayed. The thumbnail representation 1064 may be embedded in the animated notification 1006, or it may be referenced by a URI. The thumbnail representation 1064 may be pulled from the imaging device 1002 or from a host, where the construction of the animated notification 1006 may have originated.

The animated notification 1006 may also be programmed to be interactive in other ways. For example, the animated notification 1006 may be displayed in response to a condition of the imaging device 1002 requiring the user's attention. The animated notification 1006 may be used to visually/audibly indicate the condition to the user and then prompt the user for an action. Alternately, the animated notification 1006 may be used to demonstrate the outcome of one or more selections from a prompt.

Figure 11:
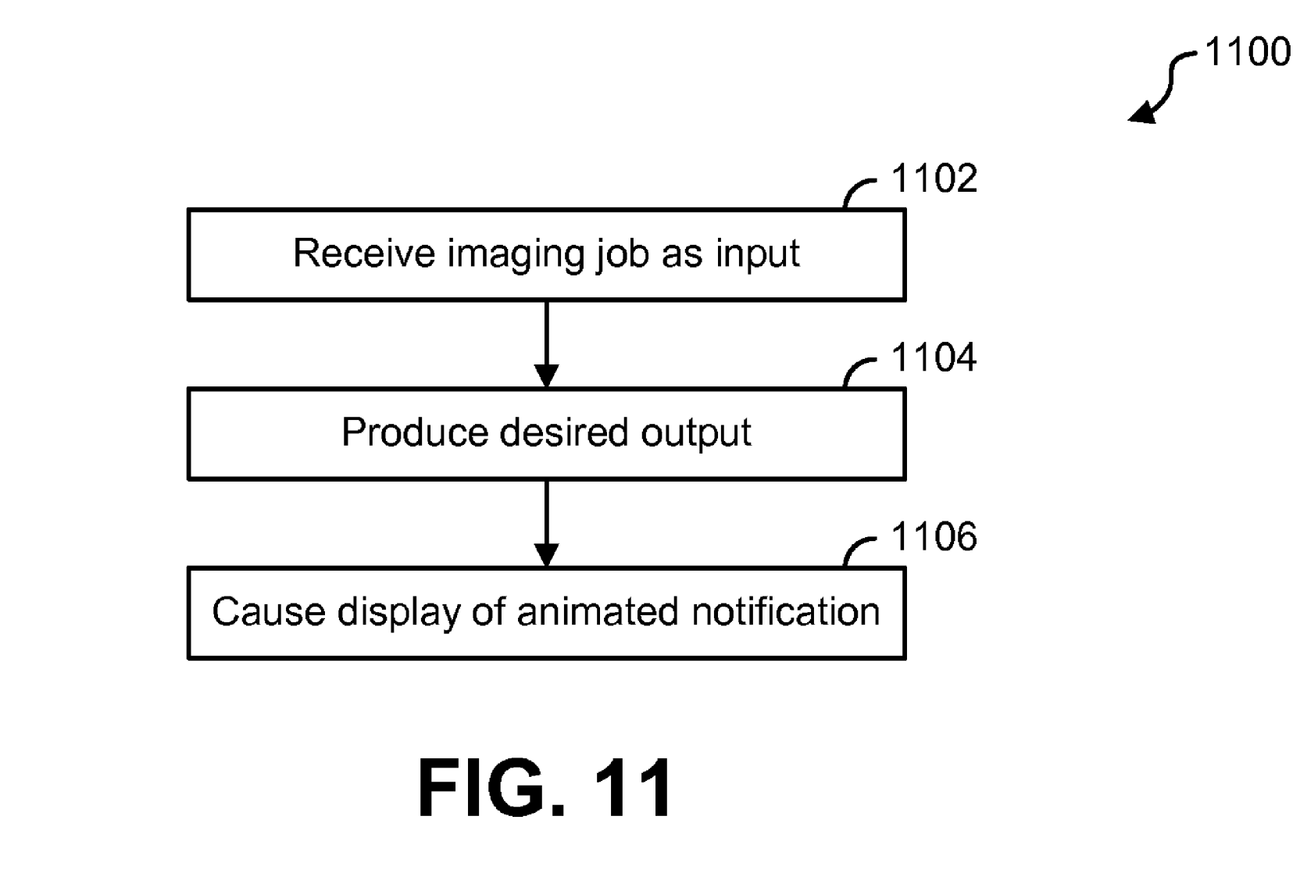
FIG. 11 illustrates a method for providing visual notifications related to an imaging job.

FIG. 11 illustrates a method 1100 for providing visual notifications related to an imaging job 104. An imaging device 102 may receive 1102 an imaging job 104 as input. The imaging job 104 may be input as a walkup job. Alternatively, the imaging job 104 may be received from a remote interface 110. The imaging device 102 may produce 1104 desired output for the imaging job 104. The imaging device 102 may receive either a softcopy input or a hardcopy input and produce either a softcopy output or a hardcopy output.

The imaging device 102 may cause 1106 the display of at least one animated notification 106 that depicts the progress of the imaging job 104. For example, the imaging device 102 may render the animated notifications 106 to a display 108 of the imaging device 102. Alternatively, the imaging device 102 may send the animated notifications 106 to a remote interface 110, such as a web server 958 or a software application. An animated notification 106 may be an animated image 220. Alternatively, an animated notification 106 may be an audio/video file.

Figure 12:
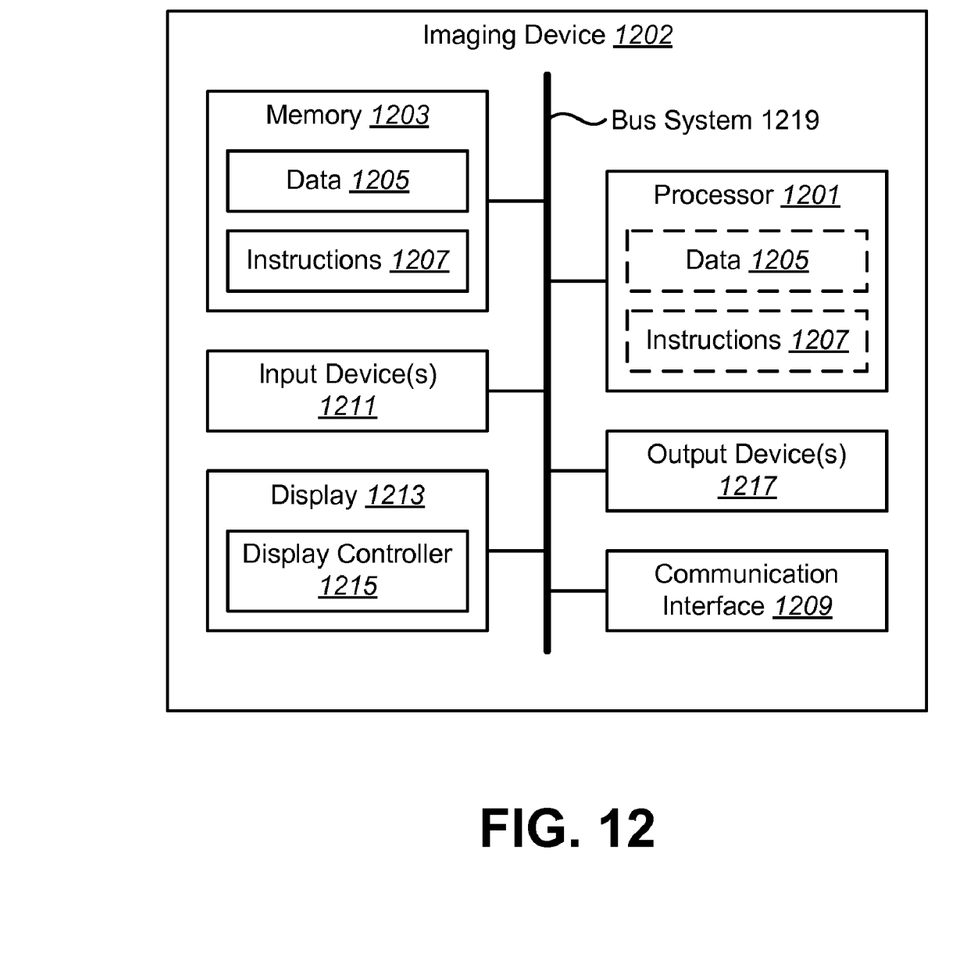
FIG. 12 illustrates certain components that may be included within an imaging device.

FIG. 12 illustrates certain components that may be included within an imaging device 1202. The imaging device 1202 includes a processor 1201. The processor 1201 may be a general purpose single- or multi-chip microprocessor (e.g., an ARM), a special purpose microprocessor (e.g., a digital signal processor (DSP)), a microcontroller, a programmable gate array, etc. The processor 1201 may be referred to as a central processing unit (CPU). Although just a single processor 1201 is shown in the imaging device 1202 of FIG. 12, in an alternative configuration, a combination of processors (e.g., an ARM and DSP) could be used.

The imaging device 1202 also includes memory 1203. The memory 1203 may be any electronic component capable of storing electronic information. The memory 1203 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1205 and instructions 1207 may be stored in the memory 1203. The instructions 1207 may be executable by the processor 1201 to implement methods disclosed herein. Executing the instructions 1207 may involve the use of the data 1205 that is stored in the memory 1203.

The imaging device 1202 may also include one or more communication interfaces 1209 for communicating with other computing devices. Communication with other computing devices may occur directly and/or via a computer network. A communication interface 1209 may include one or more communication ports, such as Ethernet ports, Universal Serial Bus (USB) ports, parallel ports, serial ports, etc.

The imaging device 1202 may also include one or more input devices 1211. Examples of input devices 1211 include a keyboard, mouse, touch-screen display, remote control device, microphone, button, joystick, trackball, touchpad, light-pen, etc.

The imaging device 1202 may also include a display 1213. A display controller 1215 may also be provided, for converting data 1205 stored in the memory 1203 into text, graphics, and/or moving images (as appropriate) shown on the display 1213. One or more other output devices 1217, such as audio speakers, may also be included in the imaging device 1202.

The various components of the imaging device 1202 may be coupled together by one or more buses, which may include a power bus, a control signal bus, a status signal bus, a data bus, etc. For the sake of clarity, the various buses are illustrated in FIG. 12 as a bus system 1219.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing visual notifications related to an imaging job, the method being implemented by an imaging device, the method comprising:
receiving, at the imaging device, the imaging job as input;
inserting, by the imaging device, at least one activation point within the imaging job, wherein the at least one activation point is a location within the imaging job where at least one animated notification is initiated;
producing, at the imaging device, desired output for the imaging job; and
causing, by the imaging device, the display of the at least one animated notification at the at least one activation point.

2. The method of claim 1, wherein the at least one animated notification is an animated image.

3. The method of claim 1, wherein causing the display of the at least one animated notification comprises rendering the at least one animated notification to a display of the imaging device.

4. The method of claim 1, wherein causing the display of the at least one animated notification comprises sending the at least one animated notification to a remote interface.

5. The method of claim 4, wherein the remote interface is a web server, and wherein the web server dynamically generates a web page that incorporates the animated notification.

6. The method of claim 1, wherein the at least one animated notification is embedded in the imaging job.

7. The method of claim 1, wherein the imaging job comprises at least one reference to an animated notification.

8. The method of claim 1, wherein the at least one animated notification depicts the progress of the imaging job, and wherein the entire progress of the imaging job is represented by a single animated image, and wherein the imaging job comprises at least one command to display a frame sequence within the animated image.

9. The method of claim 1, wherein the at least one animated notification is included in firmware of the imaging device.

10. The method of claim 1, wherein the at least one animated notification depicts the progress of the imaging job, and wherein the at least one animated notification reflects the progress of the imaging job across multiple imaging devices.

11. The method of claim 1, wherein the at least one animated notification is rendered by a process on a separate imaging device that is external to the imaging device.

12. The method of claim 1, wherein the at least one animated notification is user interactive.

13. An imaging device, comprising:
a processor;
memory in electronic communication with the processor;
instructions stored in the memory, the instructions being executable to:
receive an imaging job as input;
insert at least one activation point within the imaging job, wherein the at least one activation point is a location within the imaging job where at least one animated notification is initiated;
produce desired output for the imaging job; and
cause the display of the at least one animated notification at the at least one activation point.

14. The imaging device of claim 13, wherein the at least one animated notification is an animated image.

15. The imaging device of claim 13, wherein causing the display of the at least one animated notification comprises rendering the at least one animated notification to a display of the imaging device.

16. The imaging device of claim 13, wherein causing the display of the at least one animated notification comprises sending the at least one animated notification to a remote interface.

17. The imaging device of claim 13, wherein the at least one animated notification is embedded in the imaging job.

18. The imaging device of claim 13, wherein the imaging job comprises at least one reference to an animated notification.

19. The imaging device of claim 13, wherein the at least one animated notification depicts the progress of the imaging job, and wherein the entire progress of the imaging job is represented by a single animated image, and wherein the imaging job comprises at least one command to display a frame sequence within the animated image.

20. A non-transitory computer-readable storage medium comprising executable instructions for providing visual notifications related to an imaging job, the instructions being executable to:
receive the imaging job as input;
insert at least one activation point within the imaging job, wherein the at least one activation point is a location within the imaging job where at least one animated notification is initiated;
produce desired output for the imaging job; and
cause the display of the at least one animated notification at the at least one activation point.

* * * * *